Figure 1:
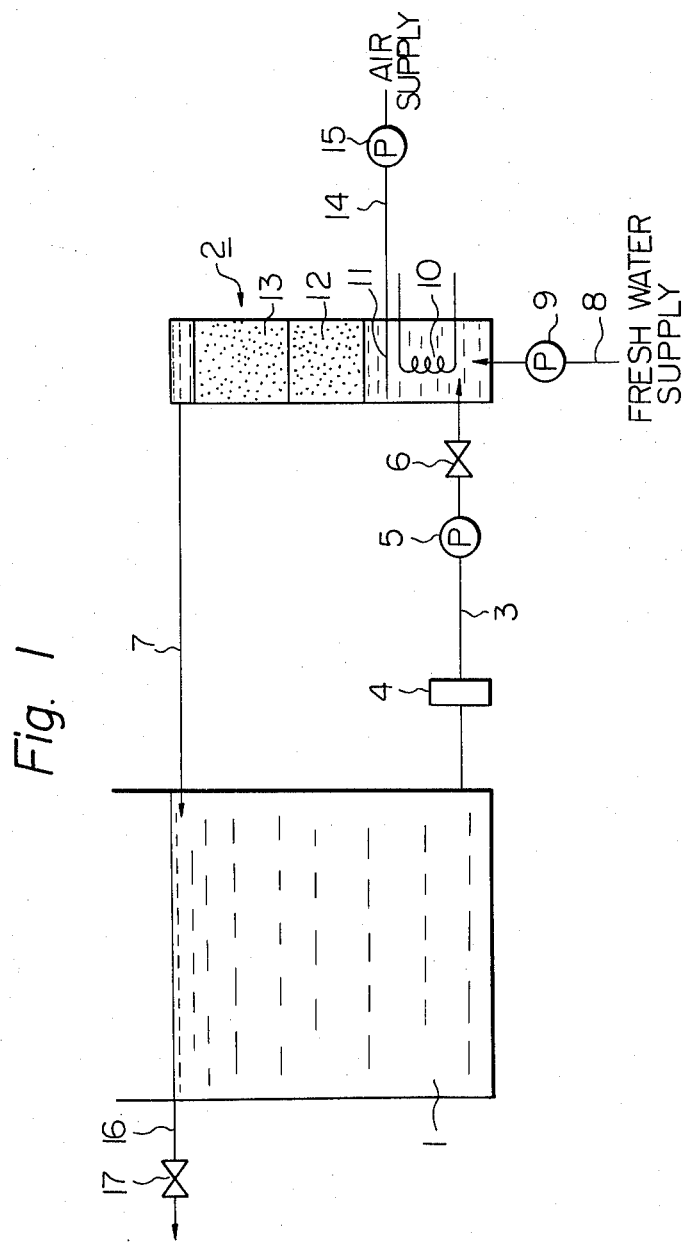

United States Patent [19]

Kominami et al.

[11]  4,240,376

[45]  Dec. 23, 1980

[54] METHOD FOR KEEPING AQUATIC ANIMALS ALIVE OVER LONG PERIODS OF TIME

[75] Inventors: Naoya Kominami; Hirokazu Fukumi; Naokuni Yamawaki; Junji Nomura, all of Fuji, Japan

[73] Assignee: Asahi Kasei Kogyo Kabushiki Kaisha, Tokyo, Japan

[21] Appl. No.: 969,132

[22] Filed: Dec. 13, 1978

Related U.S. Application Data

[63] Continuation-in-part of Ser. No. 802,338, Jun. 1, 1977.

[30] Foreign Application Priority Data

Jun. 8, 1976 [JP] Japan .................................. 51/66814

[51] Int. Cl.³ .............................................. A01K 63/00
[52] U.S. Cl. ......................................... 119/2; 119/3; 119/4
[58] Field of Search .............................. 119/3, 2, 4, 5

[56] References Cited

U.S. PATENT DOCUMENTS

| | | | |
|---|---|---|---|
| 880,783 | 3/1908 | Erlwein et al. | 119/5 |
| 2,944,513 | 7/1960 | Keely | 119/2 X |
| 3,661,262 | 5/1972 | Sanders | 119/3 X |
| 3,888,210 | 6/1975 | Buss | 119/3 |
| 3,983,843 | 10/1976 | Johnson | 119/5 |

Primary Examiner—Gene Mancene
Assistant Examiner—Robert P. Swiatek
Attorney, Agent, or Firm—Sprung, Felfe, Horn, Lynch & Kramer

[57] ABSTRACT

Aquatic animals can be kept in a living condition over a long period of time, without feeding them, by placing the aquatic animals, at a large density of more than 200 kg/m³ in environmental water; maintaining the temperature of the environmental water in a lowest possible range in which it is possible for the aquatic animals to exist; controlling the concentrations of ammonia compounds, water-soluble organic compounds and carbonic acid radical in the environmental water so that their levels do not exceed 20 ppm, 150 ppm and 1,000 ppm, respectively; and regulating the concentration of molecular oxygen dissolved in the environmental water so that it is 3 ppm or more.

22 Claims, 2 Drawing Figures

METHOD FOR KEEPING AQUATIC ANIMALS ALIVE OVER LONG PERIODS OF TIME

This application is a continuation-in-part of our co-pending application Ser. No. 802,338 filed on June 1, 1977.

The present invention relates to a method for keeping aquatic animals alive over a long period of time. More particularly, the present invention relates to a method for keeping aquatic animals alive in an environmental water over a long period of time without feeding them. The term "environmental water" used herein refers to water in which the live aquatic animals are placed to keep them alive. The environmental water may be supplied from the sea, rivers or city water supply.

In order to keep aquatic animals, which have been caught, for example, shell fish, crustaceans and mollusks, alive for as long as possible, the aquatic animals are usually placed in a fish preserve provided by partitioning a portion of the sea or a river and allowed to move freely. However, recently some portions of the seas and rivers, particularly close to big cities, have become heavily polluted. Therefore, the live aquatic animals placed in the fish preserves located in such polluted seas or rivers often die within a short period of time.

In another conventional method, the live aquatic animals are placed in a container through which non-polluted water flows or is recycled, and are allowed to move freely in the container. This method is effective for keeping the aquatic animals alive for a long period of time. However, this conventional method requires a container with a large volume as well as a large amount of fresh water, so that the aquatic animals can move freely in the environmental water in the container. Further, this conventional method requires a continuous supply of fresh water into the container and a continuous discharge of water from the container. The continuous supply and discharge of the environmental water results in the cost of this method being very high.

Generally speaking, a live aquatic animal has energy metabolism. This energy metabolism involves standard energy metabolism and action energy metabolism. Generally, the value of the metabolic action energy is about 8 to 10 times that of the metabolic standard energy. Therefore, in cases where the live aquatic animal can move freely, it is necessary to feed the aquatic animals. This feeding causes the costs of the conventional methods to become very high. Further, it is obvious that the conventional methods cannot be utilized for the purpose of transporting live aquatic animals over a long period of time.

An object of the present invention is to provide a method for keeping aquatic animals alive over a long period of time without feeding them, in a high density, in environmental water, in a relatively small container and at a relatively low cost.

Another object of the present invention is to provide a method for keeping aquatic animals alive over a long period of time without feeding them, in a high density, in environmental water and without the continuous supply of fresh environmental water.

A further object of the present invention is to provide a method for keeping aquatic animals alive, said method being utilized for transporting the aquatic animals over a long period of time, without feeding them, and in a high density in environmental water.

The above-mentioned objects can be attained by the method of the present invention. The method of the present invention comprises the operations of:

(A) placing aquatic animals in a density larger than 200 kg/m$^3$ in environmental water;

(B) controlling the temperature of the environmental water so that it is maintained at a temperature of from the lowest possible temperature at which the aquatic animals are able to exist to a temperature of 7° C. above the lowest possible temperature;

(C) controlling ammonia compounds in the environmental water so that their total concentration does not exceed 20 ppm;

(D) controlling water-soluble organic compounds in the environmental water so that their total concentration does not exceed 150 ppm;

(E) controlling carbonic acid radical in the environmental water so that it does not exceed a concentration of 1000 ppm, and;

(F) regulating molecular oxygen dissolved in the environmental water so that its concentration is maintained at 3 ppm or more.

Figure 2:
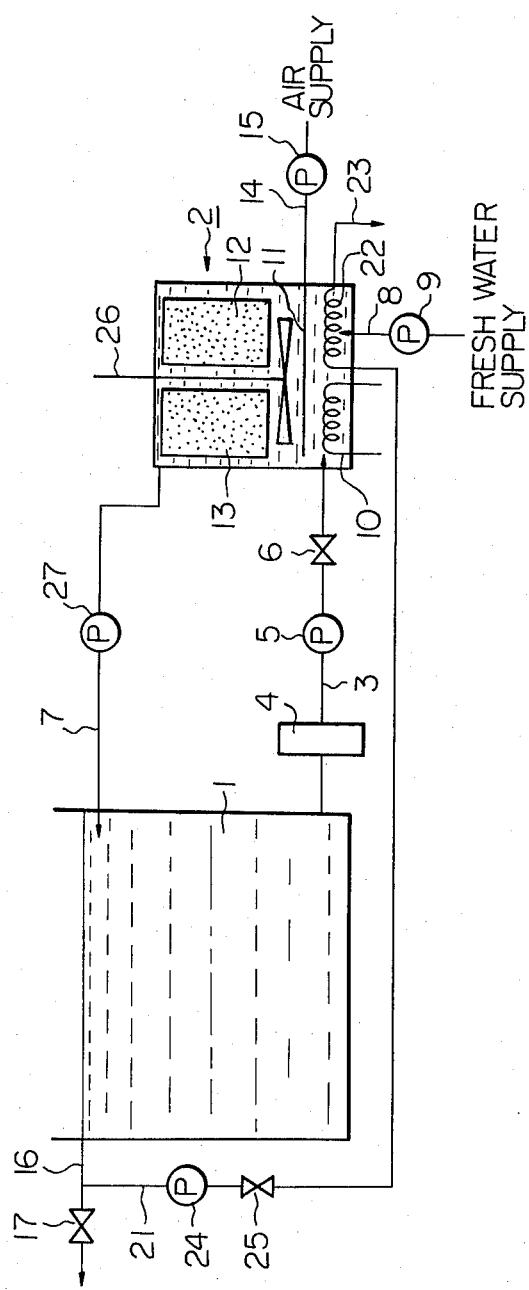

The features and advantages of the present invention will be exemplified and more fully explained in the description presented below with reference to the accompanying drawings, in which;

FIG. 1 is an explanatory diagram of an apparatus for effecting the method of the present invention; and FIG. 2 is an explanatory diagram of another apparatus for effecting the method of the present invention.

It is well known that when live aquatic animals are kept in environmental water, the environmental water is contaminated with excretions of the aquatic animals due to their metabolism. As stated hereinbefore, the metabolism involves standard metabolism and action metabolism, and the value of the metabolic action energy is about 8 to 10 times that of the metabolic standard energy. Also, it is known that the value of the metabolic standard energy of the aquatic animal at a certain temperature can be reduced to one half of the above-mentioned value by lowering the temperature of the aquatic animals to a temperature 10° C. below the above-mentioned certain temperature. Further, it is known that the value of the metabolic action energy of the aquatic animal can be reduced by restricting the movement of the aquatic animals. However, it has been long believed that in order to keep the aquatic animals alive, it is necessary to maintain the aquatic animals at an optimum temperature at which the aquatic animals can exist while allowing the aquatic animals to move freely.

Contrary to the above-mentioned facts, the inventors of the present invention discovered that when the aquatic animals are maintained in the lowest possible temperature range in which the aquatic animals are able to exist, the aquatic animals are usually kept in such a still condition that the consumption of the metabolic action energy of the aquatic animals becomes comparative to that of their metabolic standard energy; whereas the aquatic animals are still sensitive to external stimuli such as light, sound and vibration. Also, it was discovered that even when the aquatic animals are maintained in the above-mentioned lowest possible temperature range, if the density of the aquatic animals in the environmental water in the container is 200 kg/m$^3$ or less, for example, about 100 kg/m$^3$, the external stimulation causes the aquatic animals to vigorously move in the environmental water. This vigorous movement causes the aquatic animals to bump against each other or the walls of the container of the environmental water. This bumping results in promoting the death of the aquatic animals. For example, it has been found that when the live aquatic animals are contained at a relatively small density of 80 to 200 kg/m$^3$ in the environmental water in the container, the aquatic animals can be kept alive for only about 50 hours or less.

Surprisingly, it was discovered by the inventors that when the aquatic animals are kept alive in the environmental water in the above-mentioned lowest possible temperature range, a density of the aquatic animals greater than 200 kg/m$^3$ in the environmental water causes the aquatic animals to maintain a still condition.

Furthermore, surprisingly, it was discovered that as long as the aquatic animals are conditioned at a temperature of from the lowest possible temperature at which the aquatic animals are able to exist to a temperature of 7° C. above the lowest possible temperature, and at a density greater than 200 kg/m$^3$ in the environmental water, and each of the concentrations of ammonia compounds, water-soluble organic compounds, carboxylic acid radical and molecular oxygen in the environmental water is controlled so as to be maintained at a predetermined value, the aquatic animals can be kept alive over a long period of time without feeding them.

The present invention is based on the above-mentioned discovery. That is, in the method of the present invention, it is important, for protecting the aquatic animals from external stimulation and for maintaining the aquatic animals alive for a long period of time without feeding them, that the aquatic animals be not only maintained at a temperature of from the lowest possible temperature at which the aquatic animals can exist to a temperature of 7° C. above the lowest possible temperature, but also be placed at an extremely high density of more than 200 kg/m$^3$, preferably, greater than 200 kg/m$^3$ but not exceeding 700 kg/m$^3$, more preferably, from 250 to 600 kg/m$^3$, in the environmental water. The high density of the aquatic animals results not only in restricting the movement of the aquatic animals in the environmental water so as to cause a low consumption of the metabolic action energy of the aquatic animals, but also in keeping the aquatic animals insensitive to external stimulation.

For example, when adult prawns, each having an average weight of 30 g, are placed, at a density of 300 kg/m$^3$ in the environmental water, the prawns substantially cannot move and are substantially insensitive to external stimulation. The low temperature of the environmental water results in a low consumption of the metabolic standard energy of the aquatic animals. Therefore, under these circumstances, most of the metabolic energy of the aquatic animals is consumed for the purpose of maintaining their life. This results in the life of the aquatic animals being extended. In the method of the present invention, the extended life of the aquatic animal is about 10 to 20 times that in the conventional method.

In the method of the present invention, the temperature of the environmental water is adjusted to a temperature of from the lowest possible temperature at which the aquatic animals can exist to a temperature of 7° C. above the lowest possible temperature. This lowest possible living temperature varies depending on the kind of the aquatic animals. However, the lowest possible living temperature of each of the popular aquatic animals is disclosed in various literature. When a temperature at which one kind of aquatic animal dies is known, the lowest possible living temperature of that type of aquatic animal can be defined as a temperature just above that fatal temperature. The possible living temperature of each kind of the aquatic animals is variable depending on the age, the environmental conditions and the place in which the aquatic animals live. Also, the lowest possible living temperature can be altered within a certain range acclimatising the aquatic animals to a temperature. According to literature and the inventors' experiments, the lowest possible temperature at which the aquatic animals are able to exist is in a range, for example, in the case of adult sea-breams, from 6° to 8° C.; in the case of adult carp, from 1° to 2° C.; in the case of adult eel, about 5° C.; in the case of adult prawns, about 6° C.; in the case of adult abalons, about 6° C., and; in the case of adult trout, from 0.5° to 1° C.

In the method of the present invention, the lowest possible living temperature of the environmental water is adjusted, for example, in the case of adult red sea-breams, from 6° to 13° C., in the case of adult carps, from 1° to 8° C., in case of adult eels, from 5° to 12° C., and in case of adult prawns, from 6° to 13° C. The above-mentioned lowest possible living temperature range of the aquatic animals should be definitely distinguished from the temperature range in which the aquatic animals are raised by being fed.

While the aquatic animals are being kept alive in the environmental water, the aquatic animals consume molecular oxygen dissolved in the environmental water and excrete carbon dioxide ammonia compounds and water-soluble organic compounds, such as urea, uric acid, creatine, creatinine, amino acids, higher fatty acids and trimethyl amine. The aquatic animals cannot be kept alive in environmental water containing certain amounts of the above-mentioned excreted compounds and a very small amount of molecular oxygen.

The supply of the molecular oxygen into the environmental water and the removal of the carbon dioxide from the environmental water can be effected by bringing the environmental water into contact with air so as to allow the molecular oxygen in the air to dissolve into the environmental water and, also, so as to allow the carbon dioxide in the environmental water to be released from the environmental water into the air. The contact of the environmental water with the air may be effected by blowing and bubbling air into the environmental water or by spraying the environmental water into the atmospheric air. These operations are simple and economical.

However, the ammonia compounds are very soluble in water and at a pH of 7 to 9, at which the aquatic animals can exist, most of the ammonia compounds are in the form of ammonium compounds which are non-volatile. Accordingly, the ammonia compounds cannot be removed from the environmental water by the above-mentioned contact of the environmental water with the air. Also, the water-soluble organic compounds, such as, urea, uric acid, creatine, creatinine, amino acids, higher fatty acids and trimethylamine which are non-volatile, cannot be removed by the simple contact of the environmental water with the air.

In the method of the present invention, the aquatic animals are placed, in an extremely high density of more than 200 kg/m$^3$, in the environmental water, and the temperature of the environmental water is maintained as low as it is possible for the aquatic animals to exist. The high density and the low temperature cause a low consumption of the molecular oxygen and low excretions of carbon dioxide, ammonia compounds and water-soluble organic compounds by the aquatic animals in the environmental water. Also, in the method of the present invention, the concentrations of the ammonia compounds, the water-soluble organic compounds and the carbonic acid radical in the environmental water are controlled so as to be maintained at levels not exceeding 20 ppm, 150 ppm and 1000 ppm, respectively. Also the concentration of the molecular oxygen dissolved in the environmental water is controlled so as to be maintained at 3 ppm or more.

The above-mentioned controls of the concentrations of the ammonia compounds, water-soluble organic compound, carbonic acid radical and molecular oxygen dissolved in the environmental water may be carried out by continuously flowing fresh water containing less than 20 ppm of the ammonia compounds, less than 150 ppm of the water-soluble organic compounds, less than 1000 ppm of the carbonic acid radical and more than 3 ppm of molecular oxygen, and having a predetermined low temperature, throughout the environment of the aquatic animals. The flow rate of the fresh water may be determined based on the type of aquatic animals. Usually, the flow rate is in a range of from 60 to 1000 liters/hour/kg of aquatic animals.

In the case where the environmental water is kept in the environment of the aquatic animals for a long period of time without supplying more fresh environmental water, or in the case where only a portion of the used environmental water is replaced by fresh water, it is necessary to recycle the environmental water through the environment of the aquatic animals and to the outside of that environment. In this case, while the environmental water is outside of the environment of the aquatic animals, the ammonia compounds water-soluble organic compounds and carbonic acid radical are eliminated from the environmental water, molecular oxygen is dissolved into the environmental water, and the environmental water is adjusted to a predetermined temperature.

The total concentration of the ammonia compounds may be determined by the indophenol method. The total concentration of the water-soluble organic compounds may be determined in accordance with the JIS K-0102, $KM_nO_4$ method at a temperature of 100° C. The concentration of carbonic acid radical may be determined by the Conway microdiffusion analysis method. The concentration of molecular oxygen may be determined by using a DISSOLVED OXYGEN TESTER, Model 151, made by Yellow Spring Co.

The elimination of the ammonia compounds from the environmental water may be effected by bringing the environmental water into contact with a mass of adsorbing material which is capable of allowing the environmental water to flow through the mass. The adsorbing material may be selected from organic polymeric ion-exchange resins; inorganic ion-exchange materials, for example, natural zeolite, synthetic zeolite, aluminium alumino-silicate, magnesium alumino-silicate, silica, alumina, acid clay and activated clay; zirconium type ion-exchange materials, for example, zirconium phosphate, zirconium tungstate and zirconium molybdate; activated carbon; and mixtures of two or more of the above-mentioned materials. These materials are very effective for removal of the ammonia compound even by using them in a relatively small amount.

The above-mentioned adsorbing materials are particularly effective for eliminating the ammonia compound from sea water. When the environmental water is supplied from a river or city water system, the adsorbing material may be an organic polymeric ion-exchange resin, for example, a strong acidic cation-exchange resin, such as, sulfonic acid and salt type cation-exchange resins, and a weak acidic cation-exchange resin, such as, carboxylic acid and salt type cation-exchange resins. The ion-exchange resin may be used in a mixture with the aforementioned adsorbing materials. In this case, the adsorbing material containing the cation-exchange resin can remove a small amount of certain kinds of amine compounds from the environmental water. The ammonia compounds may be eliminated by using a reverse osmosis device or an ion-exchange membrane device.

The elimination of the water-soluble organic compounds from the environmental water may be effected by bringing the environmental water into contact with a mass of adsorbing material which is capable of allowing the environmental water to flow through the mass. The adsorbing material may be selected from natural and synthetic zeolites, activated carbon, silica, silica-alumina, bone black, acid clay, activated clay, aluminium alumino-silicate, magnesium alumino-silicate, and mixtures of two or more of the above-mentioned materials.

The water-soluble organic materials may be eliminated from the environmental water by bringing the environmental water into contact with aluminium hydroxide, so as to allow the organic compounds to coagulate and precipitate together with the aluminium hydroxide and then separating the precipitation from the environmental water.

The elimination of the carbonic acid radical (carbon dioxide dissolved in the environmental water) may be carried out by bringing the environmental water into contact with atmospheric air by any of the conventional methods, for example, a method in which the air is blown and bubbled into the environmental water or a method in which the environmental water is sprayed or ejected into the atmospheric air. By these methods, the carbonic acid radical is released in the form of carbon dioxide from the environmental water into the atmospheric air.

The molecular oxygen can be supplied into the environmental water by bringing the environmental water into contact with air. This contact can be realized by blowing and bubbling air into the environmental water or by spraying or ejecting the environmental water into the atmospheric air. During the time in which the air contacts the environmental water, the molecular oxygen in the air can be dissolved into the environmental water. In place of air, oxygen gas may be used.

The temperature of the environmental water can be adjusted by using any of the conventional methods in which the environmental water is heated or cooled to a desired temperature.

In the method of the present invention, the operation for eliminating the ammonia compounds and the operation for eliminating the water-soluble organic compounds may be carried out in an optional order.

The method of the present invention can be applied to any kind of the aquatic animals, for example, adults and fries of (A) aquatic animals of Class Osteichthys: for example, sea breams such as Chrysophrys major, Oplegnathus fasciatus and Mylies maceocephalus; pink salmons such as Oncarbynchus nerka and Salmogairdeneric irideus; sweet fish, namely, Plecoglossus altivelis; loach, namely, Misgurnus anguillicaudatus; crucian, namely, Carassium carassius; carp, namely, Cyprinus carpio; eel, namely, Anguilla japonica; conger eel, namely, Conger japonicus; horse mackerels such as Trachurus japonicus and Caranx delicatissmus; sea bass, namely Lateolabrax joponicus; Puffer such as Fugurubripes rubripes; and flat fishes such as Paralichthys olivacens, Limanda herzensteini and Limanda yokohamae; (B) aquatic animals of Arthropoda Class Crustacea: for example, prawns such as Penaeus japonicus, Penacus semisulcatus and Metapeneus joyneri; shrimps such as Sergestes lucens, Pandalus kessleri and Pandalus borealis; lobsters such as Panulirus joponicus; and crabs such as Erimacrus isenbeckii, Parlithodes camtchatica, Chionoecetes pitio, Portunus tribuberculatus and Macrocheria kaempferic; (C) aquatic animals of Mollusca Class Lamellibranchia: for example, oysters, such as, Osteria gigas; scallops such as Pecten yessoensis, ask shells such as Anadara broughtonii; cockle, namely, Fulvia mutica; and hard clams such as Meretrix meretrix lusoria; (D) aquatic animals of Mollusca Class Gostropoda: for example, abalones such as Haloitis gigantea, Haliotis sidboldi, Haliotis kamtschatkana, Haliotis joponica and Haliotis discus; and (E) aquatic animals of Echinodermata: for example, sea-urchins such as Echinoidea and sea-cucumbers such as Holoihuroidea; (F) onomats such as Amyda sinensis; (G) edible frogs such as Pana catesbiana; and (H) edible snails such as Hilix ponatia.

By utilizing the method of the present invention, the aquatic animals can be kept alive for a long period of several days to one month without feeding them. Before the present invention, it was never possible to keep aquatic animals alive for the above-mentioned long period of time. Accordingly, it is obvious that the method of the present invention is very valuable and practical.

The method of the present invention can be effected, for example by using the apparatuses as shown in the accompanying drawings.

Referring to FIG. 1 of the drawings, a water tank 1 for containing aquatic animals and environmental water has an inside volume large enough to contain aquatic animals at a density of more than 200 kg per m3 of the environmental water. A control path 2 for containing a portion of the environmental water withdrawn from the water tank 1 is located outside the water tank 1. The bottom portion of the water tank 1 is connected to an inlet portion of the control path 2 through a withdraw pipe line 3 having a pump 5 for withdrawing a portion of the environmental water from the water tank 1 and for introducing the withdrawn portion of water into the control path 2. The withdraw pipe line 3 may be provided with a filter 4 for removing solid materials from the environmental water and a valve 6 for opening and closing the pipe line 3. The outlet portion of the control path is connected to the water tank 1 through a return pipe line 7 through which the withdrawn portion of the environmental water can be returned back into the water tank 1. Accordingly, the environmental water can be recycled through the water tank 1, the withdraw pipe line 3, the pump 5, the control path 2 and the return pipe line 7. The outlet end of the return pipe line 7 may be opened at any portion of the water tank 1 as long as the returned water can be uniformly distributed in the water tank 1 and, then, evenly withdrawn at the inlet end of the withdraw pipe line 3. If it is necessary, the return pipe line 7 can be provided with a pump and a valve which are not shown in FIG. 1. The control path 2 is connected at its inlet portion to a supply source of fresh environmental water through a supply pipe 8 and a pump 9. The control path 2 contains therein a means 10 for controlling the temperature of the environmental water in the control path 2 at the lowest possible temperature at which the aquatic animals are able to exist, a means 11 for bringing the environmental water in the control path into contact with air, a means 12 for eliminating ammonia compounds, and a means 13 for eliminating water-soluble organic compounds from the environmental water.

The temperature control means 10 may be composed of a heat-exchanger through which a heating medium or a cooling medium can flow as shown in FIG. 1. The temperature control means 10 is preferably located in the inlet portion of the control path 2.

The means 11 for bringing the environmental water into contact with air is preferably composed of an air pipe 14 connected to an air blowing pump 15 as shown in FIG. 1. An end portion of the air pipe 14 inserted into the control path 2 has a number of holes through which air bubbles are blown into the environmental water flowing in the control path 12.

The means 12 for eliminating the ammonia compounds may be a mass of adsorbing material which allows the environmental water to flow therethrough. The means 13 for eliminating the water-soluble organic compounds may also be a mass of adsorbing material which allows the environmental water to flow therethrough.

Thw water tank 1 may have a discharge pipe 16 for discharging the environmental water from the water tank 1. The discharge pipe 16 may be provided with a valve 17 for opening and closing the discharge pipe 16, and may be located at an upper part of the water tank 1 for discharging the portion of the environmental water which has overflowed from the water tank 1, as shown in FIG. 1.

In the apparatus shown in FIG. 2, the discharge pipe 16 has a branch pipe line 21 connected to a heat-exchanger 22 located within the inlet portion of the control path 2. When the valve 17 is closed, a portion of the environmental water overflowed from the water tank 1 is introduced into the heat-exchanger 22 for causing heat-exchange to occur between the overflowed environmental water and the fresh environmental water supplied into the inlet portion of the control path 2 through the supply pipe 8 and pump 9. Then, the portion of the overflowed environmental water is discharged through a pipe 23 to the outside of the apparatus. The branch pipe line 21 may be provided with a pump 24 and a valve 25. In the control path 2 shown in FIG. 2, the ammonia compound eliminating means 12 and the water-soluble organic compounds eliminating means 13 are arranged in parallel to each other. A stirrer 26 is also disposed in the control path 2 for agitating the environmental water in the control path 2 and for causing the environmental water to pass through the eliminating means 12 and 13. The return pipe line 7 has a pump 27 for forcibly sending the environmental water from the control path 2 into the water tank 1.

Hereinafter, the invention of the present application is illustrated in detail by the following examples.

EXAMPLE 1 AND COMPARISON EXAMPLES 1 THROUGH 6

In each of the Example 1 and Comparison Examples 1 through 6, 1665 prawns (Penaeus joponicus) each having an average weight of about 30 g were placed in a water tank having an inside volume of 125 liters (50 cm×50 cm×50 cm). Next, the water tank containing the prawns was filled with fresh sea water. The density of the prawns is the environmental sea water was about 400 kg/m³.

In Example 1, fresh sea water was introduced into a control tank and regulated to a tmperature of about 10° C., and air was blown and bubbled into the fresh sea water. In order to keep the prawns alive in the water tank, the environmental water in the water tank was continuously replaced by fresh sea water introduced from the control tank at a rate of 1.25 m³/hr. The environmental water discharged from the water tank was introduced into a heat-exchanger located within the control tank for cooling the fresh sea water in the control tank, and then the environmental water was discharged therefrom.

Ten days after the start of the experiment, the concentrations of ammonia compounds, water-soluble organic compounds, carbonic acid radical, and molecular oxygen in the environmental water discharged from the water tank were determined.

In Comparison Example 1, the same procedures as those used in Example 1 were carried out except that 400 prawns were placed at a density of 96 kg/m³ in the environmental water of the water tank.

In Comparison Example 2, the same procedures as those used in Example 1 were effected except that the temperature of the environmental water was adjusted to 25° C.

In Comparison Example 3, the same procedures as those used in Example 1 were carried out except that the total concentration of the ammonia compounds in the environmental water was regulated to 21 ppm by adding ammonium chloride to the fresh sea water in the control tank.

In Comparison Example 4, the same procedures as those used in Example 1 were carried out except that the total concentration of the water-soluble organic compounds in the environmental water was regulated to 160 ppm by adding the excretion prawns to the fresh sea water in the control tank.

In Comparison Example 5, the same operations as those used in Example 1 were conducted except that the concentration of the cabonic acid radical in the environmental water was controlled to 1200 ppm by adding sodium carbonate to the fresh sea water in the control tank.

In Comparison Example 6, the same procedures as those used in Example 1 were performed except that the concentration of molecular oxygen in the environmental water was controlled to 2.5 ppm by stopping air from being blown into the fresh sea water in the control tank.

The results of the above-mentioned experiments are shown in Table 1.

TABLE I

| Items | Example 1 | Comparison Examples 1 | 2 | 3 | 4 | 5 | 6 |
|---|---|---|---|---|---|---|---|
| Density (kg/m³) | 400 | 96 | 400 | 400 | 400 | 400 | 400 |
| Temperature (°C.) | 10 | 10 | 25 | 10 | 10 | 10 | 10 |
| Concentration (ppm) 10 days after start of experiment | | | | | | | |
| Ammonia compounds | 2 | 1.8 | 3 | 21 | 2 | 2 | 2 |
| Water-soluble organic compounds | 12 | 10 | 15 | 12 | 160 | 12 | 12 |
| Carbonic acid radical | 165 | 160 | 185 | 180 | 165 | 1200 | 165 |
| Molecular oxygen | 6.5 | 7.0 | 5.5 | 6.5 | 6.5 | 6.5 | 2.5 |
| Percentage of prawns kept alive | | | | | | | |
| 1 day after start of experiment | 100 | 100 | 98 | 92 | 98 | 96 | 96 |
| 2 days after start of experiment | 100 | 96 | 94 | 88 | 95 | 92 | 86 |
| 3 days after start of experiment | 100 | 90 | 92 | 91 | 88 | 84 | 80 |
| 5 days after start of experiment | 99 | 83 | 84 | 72 | 83 | 76 | 76 |
| 10 days after start of experiment | 97 | 74 | 70 | 48 | 78 | 62 | 72 |

EXAMPLE 2

Procedures identical to those in Example 1 were carried out in Example 2, except that 1000 young red sea breams (chrysophrys major) each having an average weight of 40 g were placed in the water tank 1 at a density of 320 kg per m³ of the environmental water and the temperature of the environmental water was controlled to 8° C. The results of Example 2 are shown in Table 2.

EXAMPLE 3

The same procedures as those used in Example 1 were effected except that 1600 young carps having an average weight of 25 g were placed in the water tank 1 at a density of 320 kg per m³ of the environmental water supplied from a city water system, and the environmental water was adjusted to a temperature of 5° C. The results of Example 3 are shown in Table 2.

TABLE 2

| Items | Example 2 | Example 3 |
|---|---|---|
| Type of fish | Red sea bream | Carp |
| Average weight of fish (g) | 40 | 25 |
| Temperature of environmental water (°C.) | 8 | 5 |
| Concentration (ppm) 10 days after start of experiment | | |
| Ammonia compounds | 2.5 | 2.0 |
| Water-soluble organic compounds | 14 | 15 |
| Carbonic acid radical | 170 | 65 |
| Molecular oxygen | 6.4 | 6.8 |
| Percentage of fish kept alive | | |
| 1 day after start of experiment | 100 | 100 |
| 2 days after start of experiment | 100 | 100 |
| 3 days after start of experiment | 100 | 99 |
| 5 days after start of experiment | 98 | 98 |
| 10 days after start of experiment | 97 | 97 |

EXAMPLE 4

The apparatus shown in FIG. 2 was employed in Example 4. The water tank 1 exhibiting an inside volume of 27 liters (30 cm×30 cm×30 cm) was charged with fresh sea water and 320 prawns (Penaeus japonicus) each having and average weight of 30 g. The density of the prawns in the environmental water was 350 kg/m³. The withdraw pipe line 3 and the return pipe line 7 were made of polyvinyl chloride pipes. The environmental water withdrawn from the water tank 1 was adjusted to a temperature of about 10° C. in the control path 2 and then returned back into the water tank 1. In the control path 2, air was blown and bubbled into the environmental water for maintaining the molecular oxygen and the carbonic acid radical dissolved in the environmental water at levels of between 5 and 8 ppm and 150 and 190 ppm, respectively. In order to eliminate the ammonia compounds from the environmental water, about 45 kg of natural zeolite particles each of from 0.3 to 0.5 cm in size were packed in a net made of polyvinylidene chloride and placed into the control path 2. Also, in order to eliminate the water-soluble organic compounds from the environmental water, 9 kg of activated carbon particles each of from 0.2 to 0.5 cm in size were packed in a net made of polyvinylidene chloride and immersed into the environmental water in the control path 2. The above-mentioned adsorbing materials were replaced with fresh ones at intervals of every 12 hours for maintaining the ammonia compounds and the water-soluble organic compounds in the environmental water at total concentrations of 3 ppm or less and 15 ppm or less, respectively. The percentages of the animals kept alive are shown below.

| Period in which animals are kept alive (day) | Percent |
|---|---|
| 18 | 96 |
| 18 | 95 |
| 30 | 93 |

The changes in appearance and appetite of the prawns during the experimental period of time were observed over a period of 30 days. No changes in both conditions were found. It was also found that the loss in weight of the live prawns during the experimental period of 30 days was 4% based on the weight of the live prawns at the start of the experiment. From this fact it is obvious that the commercial loss due to keeping the prawns alive for a long period of time is very small.

EXAMPLES 5 AND 6 AND COMPARISON EXAMPLES 7 THROUGH 9

In Example 5, the same procedures as those used in Example 4 were effected except that 50 adult conger eels each having an average weight of 260 g were placed in the water tank 1 so that the density of the conger eels became 480 kg per m³ of the environmental water. Furthermore, the temperature of the environmental water was adjusted to that of 10° C., and the adsorbing materials for the ammonia compounds and the water-soluble organic compounds were replaced by fresh ones at intervals of every 12 hours.

In Example 6, the same procedures as those used in Example 5 were effected except that the adsorbing materials were replaced by fresh ones at intervals of every 24 hours. In Comparison Examples 7 through 9, the same procedures as those used in Example 5 were repeated except that the adsorbing materials for the ammonia compounds and the water-soluble organic materials were respectively replaced by fresh ones at intervals of every 24 hours and 36 hours in Comparison Example 7, every 24 hours and 12 hours in Comparison Example 8 and sodium carbonate was added to the environmental water in Comparison Example 9.

The results of Examples 5 and 6 and Comparison Examples 7 through 9 are shown in Table 3.

TABLE 3

| Items | Example 5 | Example 6 | Comparison Example 7 | Comparison Example 8 | Comparison Example 9 |
|---|---|---|---|---|---|
| Concentration (ppm) 10 days after start of experiment | | | | | |
| Ammonia compounds | 4.2 | 12.8 | 21.0 | 5.5 | 5.8 |
| Water-soluble organic compounds | 26 | 48 | 45 | 160 | 33 |
| Carbonic acid radical | 380 | 620 | 450 | 360 | 1050 |
| molecular oxygen | 6.5 | 5.8 | 6.8 | 6.2 | 4.5 |
| Percentage of fish kept alive | | | | | |
| 1 day after start of experiment | 100 | 100 | 100 | 100 | 100 |
| 3 days after start of experiment | 100 | 99 | 94 | 96 | 92 |
| 5 days after start of experiment | 100 | 96 | 88 | 90 | 83 |
| 10 days after start of experiment | 98 | 92 | 75 | 82 | 74 |
| 15 days after start of experiment | 94 | 90 | 60 | 71 | 55 |

What is claimed is:

1. A method for keeping aquatic animals alive over a long period of time without feeding them and in a high density in environmental water, comprising the steps of:

(A) placing aquatic animals in a density greater than 200 kg/m³ in environmental water in a container;

(B) controlling the temperature of said environmental water so that said temperature is maintained at a temperature of from the lowest possible temperature in which said aquatic animals are able to exist to a temperature of 7° C. above said lowest possible temperature;

(C) controlling ammonia compounds in said environmental water so that the total concentration thereof does not exceed 20 ppm;

(D) controlling water-soluble organic compounds in said environmental water so that the total concentration thereof does not exceed 150 ppm;

(E) controlling carbonic acid radical in said environmental water so that it does not exceed a concentration of 1000 ppm and;

(F) regulating molecular oxygen dissolved in the environmental water so that its concentration is maintained at 3 ppm or more.

2. A method as claimed in claim 1, wherein the density of said aquatic animals is in a range higher than 200 kg/m³ but not exceeding 700 kg/m³.

3. A method as claimed in claim 2, wherein the density of said aquatic animals is in a range of from 250 to 600 kg/m³.

4. A method as claimed in claim 1, wherein said aquatic animals are adult red sea breams and the temperature of said environmental water is controlled to be within a range of from 6° to 13° C.

5. A method as claimed in claim 1, wherein said aquatic animals are adult carps, and the temperature of said environmental water is controlled to be within a range of from 1° to 8° C.

6. A method as claimed in claim 1, wherein said aquatic animals are adult eels, and the temperature of said environmental water is controlled to be within a range of from 5° to 12° C.

7. A method as claimed in claim 1, wherein said aquatic animals are adult prawns, and the temperature of said environmental water is controlled within a range of from 6° to 13° C.

8. A method as claimed in claim 1, wherein the controlling of the concentrations of the ammonia compounds and the controlling of the water-soluble organic compounds are effected by continuously flowing fresh environmental water having a concentration of the ammonia compounds of less than 20 ppm and a concentration of the water-soluble organic compounds of less than 150 ppm through the environment of said aquatic animals.

9. A method as claimed in claim 1, wherein said ammonia compounds are eliminated from said environmental water by adsorbing said ammonia compounds with an adsorbing material.

10. A method as claimed in claim 9, wherein said adsorbing material is selected from organic polymeric cation-exchange resins, natural zeolite, synthetic zeolite, aluminium alumino-silicate, magnesium alumino-silicate, zirconium phosphate, zirconium tungstate, zirconium molybdate, activated carbon and mixtures of two or more of the above-mentioned materials.

11. A method as claimed in claim 10, wherein said organic polymeric cation-exchange resin is selected from sulfonic acid and salt type strong acidic cation-exchange resins and from carboxylic acid and salt type weak acidic cation-exchange resins.

12. A method as claimed in claim 9, wherein said adsorption is carried out by flowing said environmental water through a path containing a mass of said adsorbing material.

13. A method as claimed in claim 1, wherein said water-soluble organic compounds are eliminated from said environmental water by adsorbing said organic compounds with an adsorbing material.

14. A method as claimed in claim 13, wherein said adsorbing material is selected from activated carbon, silica, silica-alumina, bone black, acid clay, activated clay and mixtures of two or more of the above-mentioned materials.

15. A method as claimed in claim 13, wherein said adsorption is carried out by flowing said environmental water through a path containing therein said adsorbing material.

16. A method as claimed in claim 1, wherein said water-soluble organic compounds are eliminated from said environmental water by coagulating and precipitating said organic compounds with aluminium hydroxide and separating said precipitation from said environmental water.

17. A method as claimed in claim 1, wherein said carbonic acid radical is removed from said environmental water by bringing said environmental water into contact with the atmospheric air so as to allow said carbonic acid radical to be released in the form of carbon dioxide from said environmental water into the atmosphere.

18. A method as claimed in claim 17, wherein said contact of said environmental water with atmospheric air is effected by blowing the atmospheric air into said environmental water.

19. A method as claimed in claim 1, wherein the concentration of said oxygen in said environmental water is controlled by bringing said environmental water into contact with air so as to allow oxygen to dissolve into said environmental water.

20. A method as claimed in claim 19, wherein said contact of said environmental water with air or oxygen gas is effected by blowing air or oxygen gas into said environmental water.

21. A method as claimed in claim 1, wherein a portion of said environmental water is withdrawn, said withdrawn portion of said environmental water is treated in steps (B) through (F) and, thereafter, said treated portion of said environmental water is returned back to the environment of said aquatic animals.

22. A method as claimed in claim 1, wherein the concentrations of said ammonia compounds and water-soluble organic compounds in said environmental water are controlled without using an oxidizing agent.

* * * * *